US011059424B2

(12) United States Patent
Hatfield

(10) Patent No.: US 11,059,424 B2
(45) Date of Patent: Jul. 13, 2021

(54) PACKAGE STABLIZING DEVICE

(71) Applicant: Rick Hatfield, Cedar Park, TX (US)

(72) Inventor: Rick Hatfield, Cedar Park, TX (US)

( * ) Notice: Subject to any disclaimer, the term of this patent is extended or adjusted under 35 U.S.C. 154(b) by 0 days.

(21) Appl. No.: 16/551,201

(22) Filed: Aug. 26, 2019

(65) Prior Publication Data
US 2021/0061177 A1 Mar. 4, 2021

(51) Int. Cl.
B60R 7/00 (2006.01)
B60R 7/04 (2006.01)
B60R 11/00 (2006.01)

(52) U.S. Cl.
CPC .............. B60R 7/005 (2013.01); B60R 7/043 (2013.01); B60R 7/046 (2013.01); B60R 2011/0015 (2013.01); B60R 2011/0026 (2013.01); B60R 2011/0056 (2013.01); B60R 2011/0059 (2013.01); B60R 2011/0075 (2013.01); B60R 2011/0087 (2013.01)

(58) Field of Classification Search
CPC ......... B60R 7/005; B60R 7/043; B60R 7/049; B60R 2011/0015; B60R 2011/0026; B60R 2011/0056; B60R 2011/0059; B60R 2011/0075; B60R 2011/0087
USPC ........................................................ 224/545
See application file for complete search history.

(56) References Cited

U.S. PATENT DOCUMENTS

| 3,039,616 | A | 6/1962 | Proffit |
| 5,676,284 | A | 10/1997 | Schenberg |
| D465,724 | S | 11/2002 | Goodman |
| 6,691,959 | B1 | 2/2004 | Dancy |
| 6,863,249 | B1 | 3/2005 | Alvord |
| 7,533,855 | B2 | 5/2009 | Marland |
| 9,102,276 | B1 * | 8/2015 | Virgin ..................... B60R 7/043 |
| 9,623,806 | B2 * | 4/2017 | Rodriguez .............. B60R 7/043 |
| 9,850,065 | B2 * | 12/2017 | Decker ................... B65F 1/141 |
| 2001/0046425 | A1 | 11/2001 | Vagnino |
| 2003/0129038 | A1 * | 7/2003 | Addy ..................... B60P 7/0823 410/97 |
| 2009/0140023 | A1 | 6/2009 | Noble |
| 2015/0021369 | A1 * | 1/2015 | Lehtonen ................ B60R 7/043 224/275 |
| 2015/0298619 | A1 * | 10/2015 | Parisi ....................... B60R 7/08 224/275 |
| 2016/0332580 | A1 * | 11/2016 | Nouri ..................... B60R 7/043 |

* cited by examiner

Primary Examiner — Peter N Helvey

(57) ABSTRACT

A package stabilizing device for use in transporting a package in a vehicle includes a bracket assembly that is configured to couple to an element of a vehicle so that an arm of the bracket assembly extends into an interior space of the vehicle. A sling is coupled to and extends from a distal limit of the arm. The sling is configured to position a package so that the package is suspended within the interior space. The sling is configured to swing within the interior space to diminish forces that are applied to contents of the package as the vehicle traverses an uneven surface, accelerates, brakes, and turns.

14 Claims, 9 Drawing Sheets

PACKAGE STABLIZING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stabilizing devices and more particularly pertains to a new stabilizing device for use in transporting a package in a vehicle.

(2) Description of Related Art Including Information Disclosed Under 37 CFR 1.97 and 1.98

The prior art relates to stabilizing devices.

BRIEF SUMMARY OF THE INVENTION

An embodiment of the disclosure meets the needs presented above by generally comprising a bracket assembly that is configured to couple to an element of a vehicle so that an arm of the bracket assembly extends into an interior space of the vehicle. A sling is coupled to and extends from a distal limit of the arm. The sling is configured to position a package so that the package is suspended within the interior space. The sling is configured to swing within the interior space to diminish forces that are applied to contents of the package as the vehicle traverses an uneven surface, accelerates, brakes, and turns.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
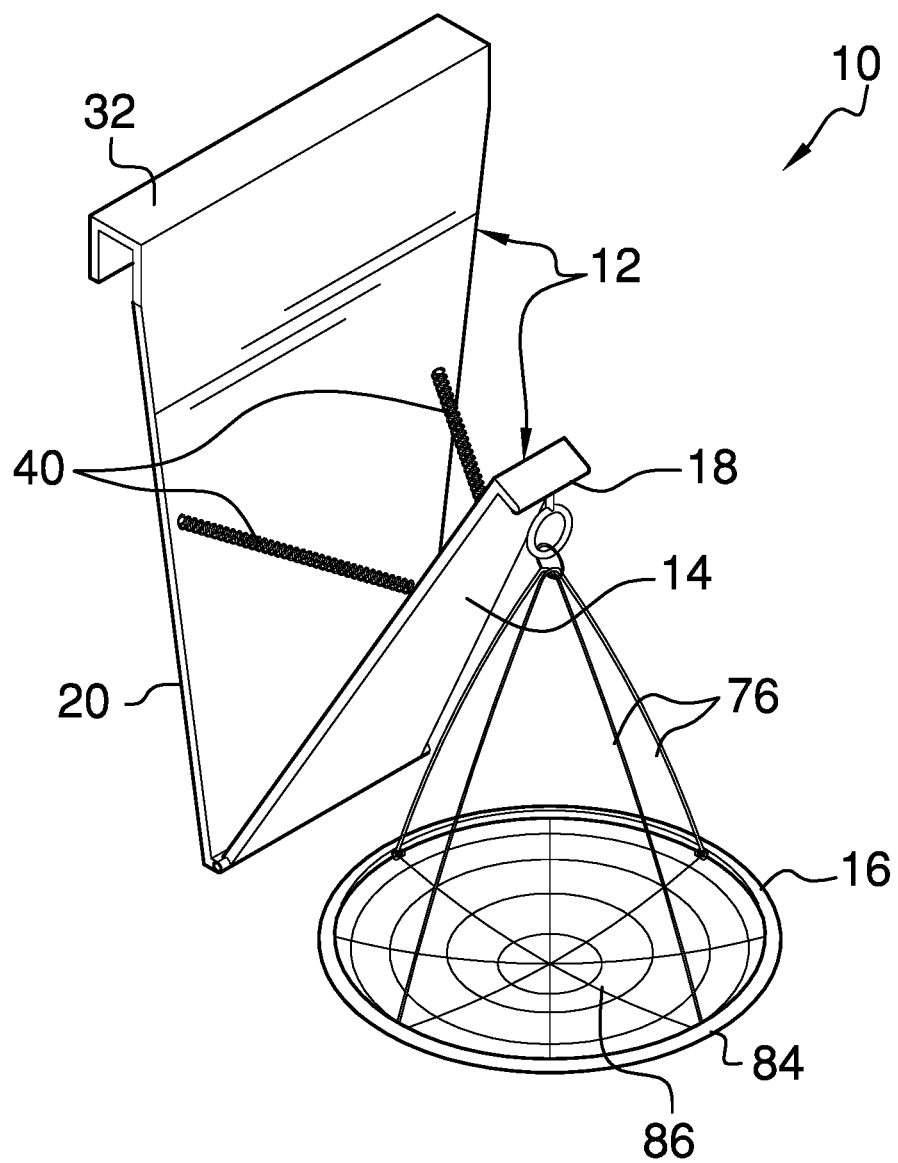
FIG. 1 is an isometric perspective view of a package stabilizing device according to an embodiment of the disclosure.

With reference now to the drawings, and in particular to FIGS. 1 through 10 thereof, a new stabilizing device embodying the principles and concepts of an embodiment of the disclosure and generally designated by the reference numeral 10 will be described.

As best illustrated in FIGS. 1 through 10, the package stabilizing device 10 generally comprises a bracket assembly 12 that is configured to couple to an element of a vehicle so that an arm 14 of the bracket assembly 12 extends into an interior space of the vehicle. A sling 16 is coupled to and extends from a distal limit 18 of the arm 14. The sling 16 is configured to position a package so that the package is suspended within the interior space. The sling 16 is configured to swing within the interior space to diminish forces that are applied to contents of the package as the vehicle traverses an uneven surface, accelerates, brakes, and turns. The device 10 is anticipated to be of particular use in transporting a package containing a carry out meal.

Figure 2:
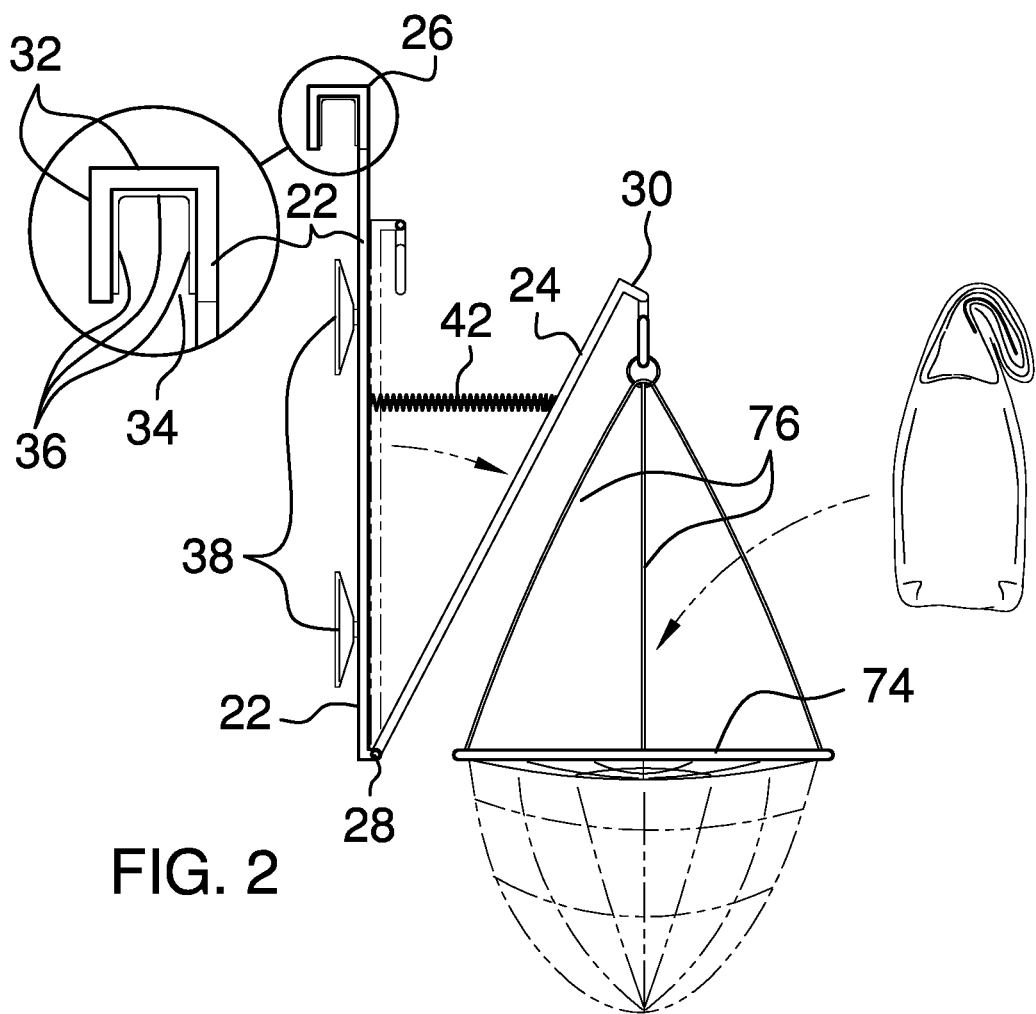
FIG. 2 is a side view of an embodiment of the disclosure.
Figure 3:
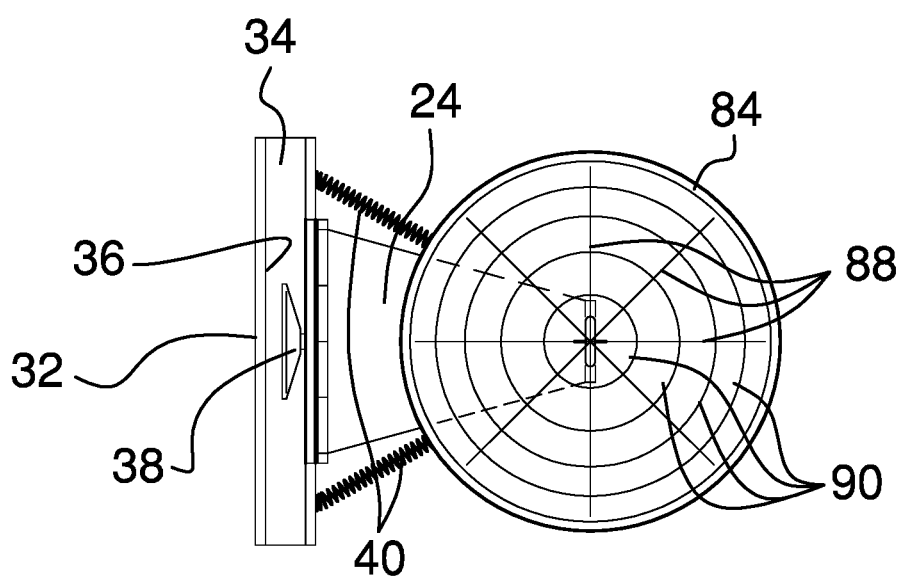
FIG. 3 is a bottom view of an embodiment of the disclosure.
Figure 4:
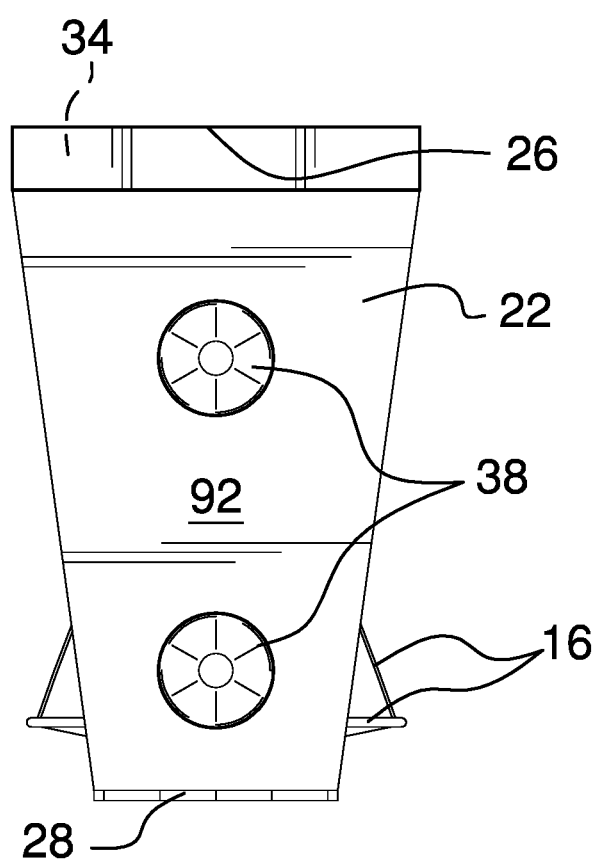
FIG. 4 is a back view of an embodiment of the disclosure.
Figure 5:
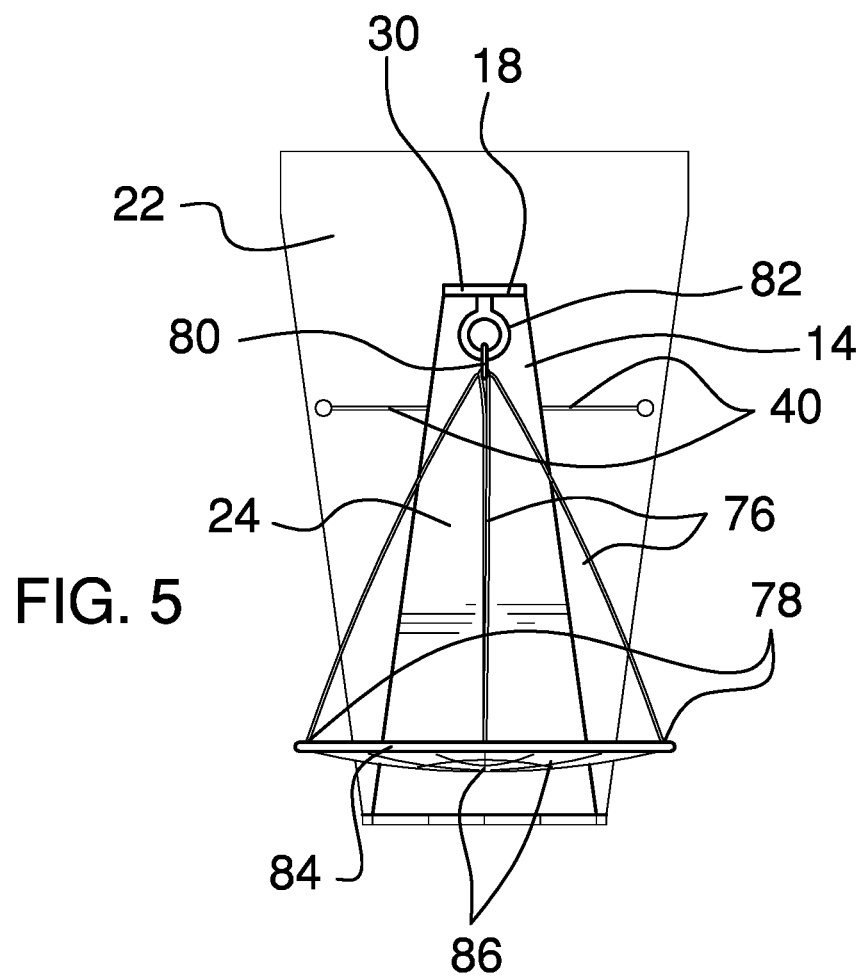
FIG. 5 is a front view of an embodiment of the disclosure.

In one embodiment, as shown in FIGS. 1-6, the bracket assembly 12 comprises a window bracket 20. The window bracket 20 comprises a first panel 22 and a second panel 24. The first panel 22 is substantially trapezoidally shaped so that an upper end 26 of the first panel 22 is dimensionally wider than a lower end 28 of the first panel 22, as shown in FIG. 4. The second panel 24 is hingedly coupled to the lower end 28 of the first panel 22. The second panel 24 also is substantially trapezoidally shaped so that the distal limit 18 of the arm 14 is dimensionally narrower than the lower end 28 of the first panel 22, as shown in FIG. 5. An extension 30 that is coupled to and extends substantially perpendicularly from the second panel 24 distal from the first panel 22 defines the distal limit 18 of the arm 14.

A lip 32 is coupled to the upper end 26 of the first panel 22, as shown in FIG. 2. The lip 32 is L-shaped so that the lip 32 and the first panel 22 define a channel 34. The channel 34 is configured to insert an upper edge of a side window of the vehicle to couple the window bracket 20 to the side window with the first panel 22 in substantial abutment with an inner surface of the side window. A pad 36 is coupled to the lip 32 and the first panel 22 and is positioned in the channel 34, as shown in FIG. 2. The pad 36 is configured to shield the side window from damage by the lip 32 and the first panel 22.

A set of cups 38 is coupled to a rear face 92 of the first panel 22. The cups 38 are resiliently compressible and are configured to be compressed against the inner surface of the side window to suctionally couple the first plate to the side window. The set of cups 38 may comprise two cups 38, as shown in FIG. 4, or other number of cups 38, such as one cup 38, three cups 38, and four cups 38. The cups 38 comprises at least one of rubber, silicone, and elastomer.

A set of first bands 40 is coupled to and extends between the first panel 22 and the second panel 24, as shown in FIG. 3. The set of first bands 40 is positioned to support the second panel 24 transversely to the first panel 22 in a default position. The first bands 40 are resiliently stretchable. The set of first bands 40 is configured to be tensioned as the second panel 24 hinges relative to the first panel 22 when the vehicle traverses an uneven surface, positioning the set of first bands 40 to rebound to return the second panel 24 to the default position. The set of first bands 40 may comprise two first bands 40, or other number of first bands 40, such as one first band 40 and three first bands 40. Each first band 40 may comprise a coiled spring 42, or other resilient retainer, such as elastic bands, bungee cords, and the like.

Figure 7:
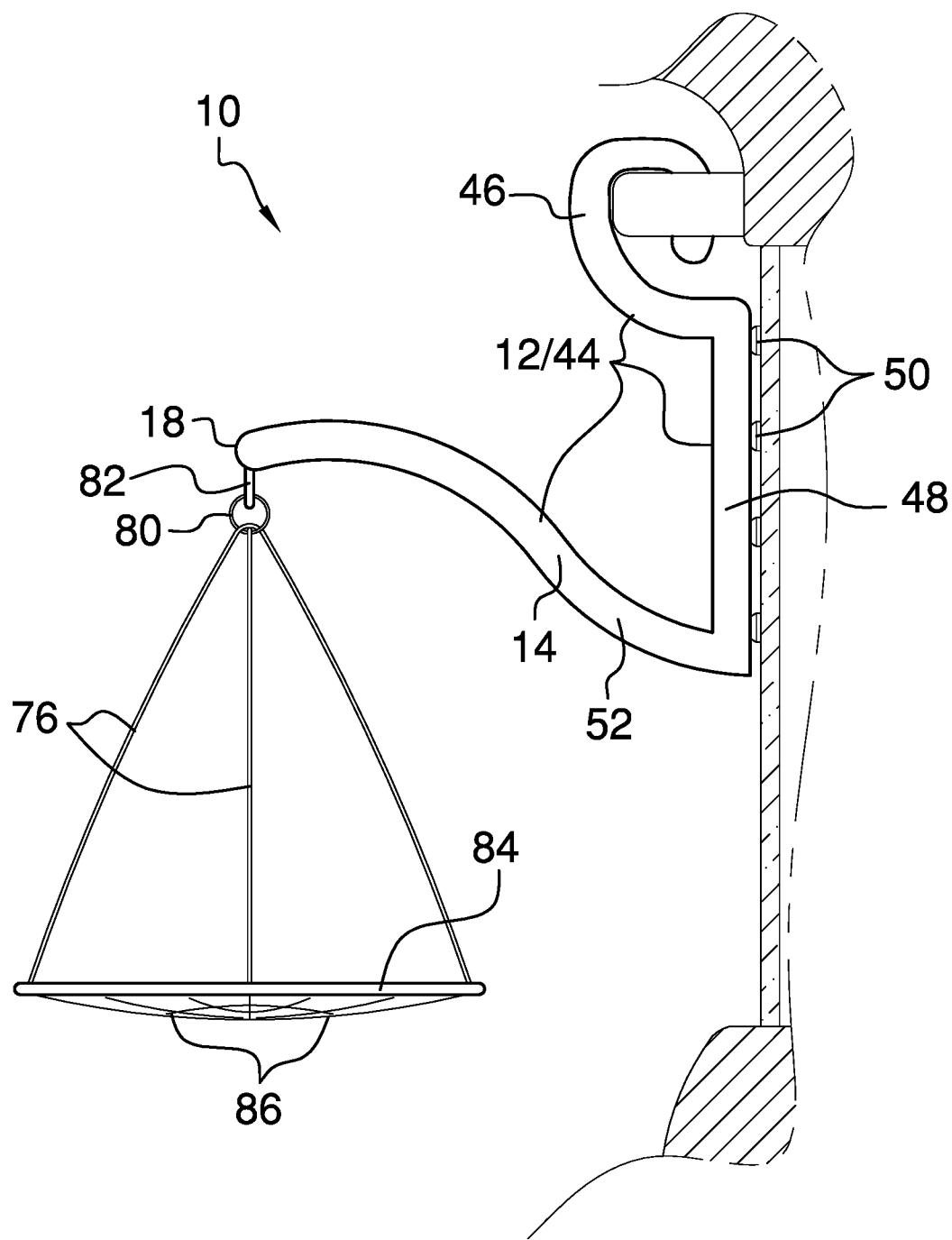
FIG. 7 is a side view of an alternative embodiment of the disclosure.
Figure 8:
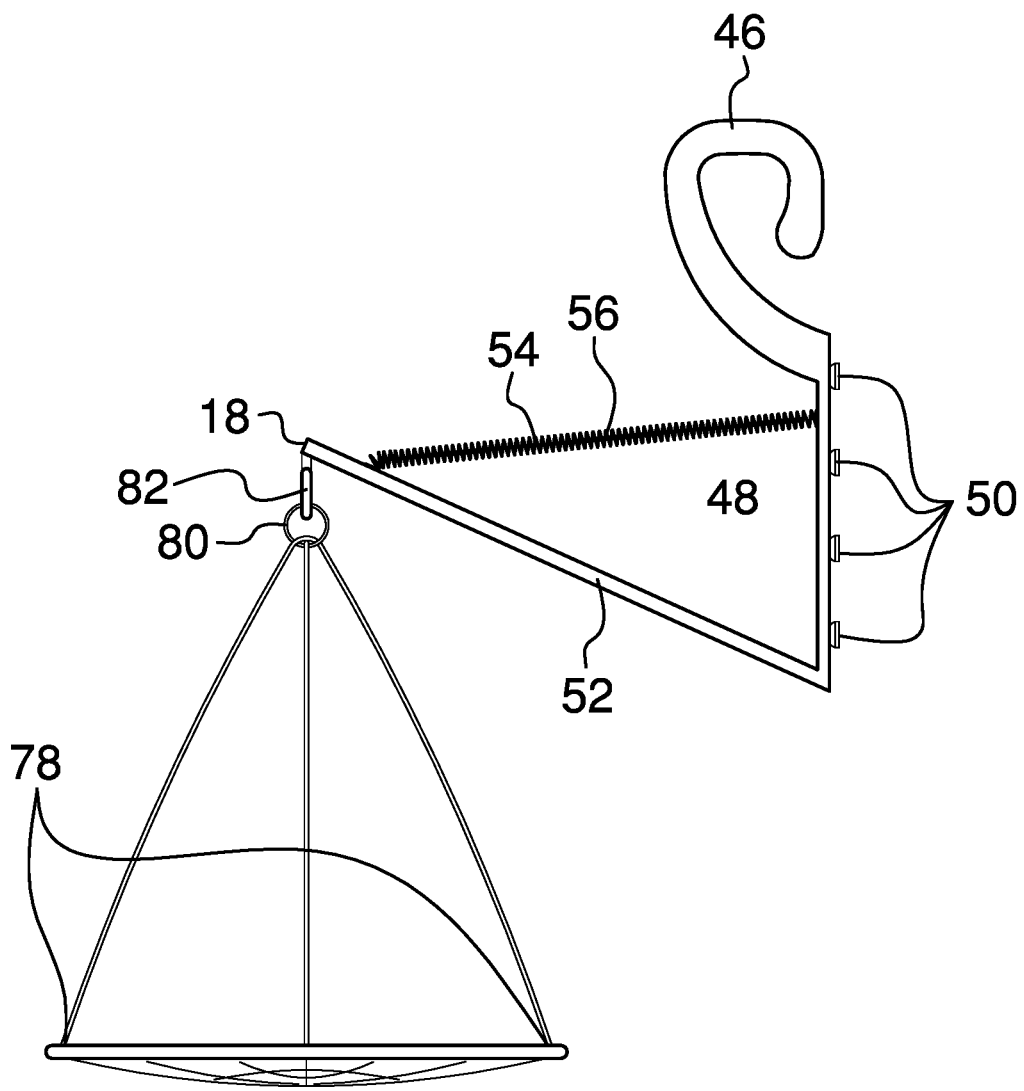
FIG. 8 is a side view of an alternative embodiment of the disclosure.

In another embodiment, as shown in FIGS. 7 and 8, the bracket assembly 12 comprises a handle bracket 44. The handle bracket 44 comprises a grapnel 46 that is configured to couple to a handle of the vehicle that is positioned above the side window. The grapnel 46 may be single hook type, or may be other hook type, such as double hook type.

A first bar 48 is coupled to and extends from the grapnel 46 so that the first bar 48 is positioned in substantial abutment with the inner surface of the side window when the grapnel 46 is coupled to the handle. A set of bumpers 50 is coupled to the first bar 48 so that the bumpers 50 are configured to shield the side window from damage by the first bar 48. The set of bumpers 50 may comprise four bumpers 50, as shown in FIG. 7, or other number of bumpers 50, such as two bumpers 50 and three bumpers 50. A second bar 52 is coupled to and extends transversely from the first bar 48 distal from the grapnel 46. The second bar 52 may be S-shaped, as shown in FIG. 7, and the second bar 52 may be resiliently bendable, as shown in FIG. 8.

In the embodiment shown in FIG. 8, a second band 54 is coupled to and extends between the first bar 48 and the second bar 52 so that the second band 54 is positioned to support the second bar 52 transversely to the first bar 48 in a default position. The second band 54 is resiliently stretchable. The second band 54 is configured to be tensioned concurrently with the second bar 52 bending as the vehicle traverses the uneven surface, positioning the second band 54 to rebound to return the second bar 52 to the default position. The second band may comprise a bracket spring 56, as shown in FIG. 8, or other resilient retainer, such as elastic bands, bungee cords, and the like.

Figure 9:
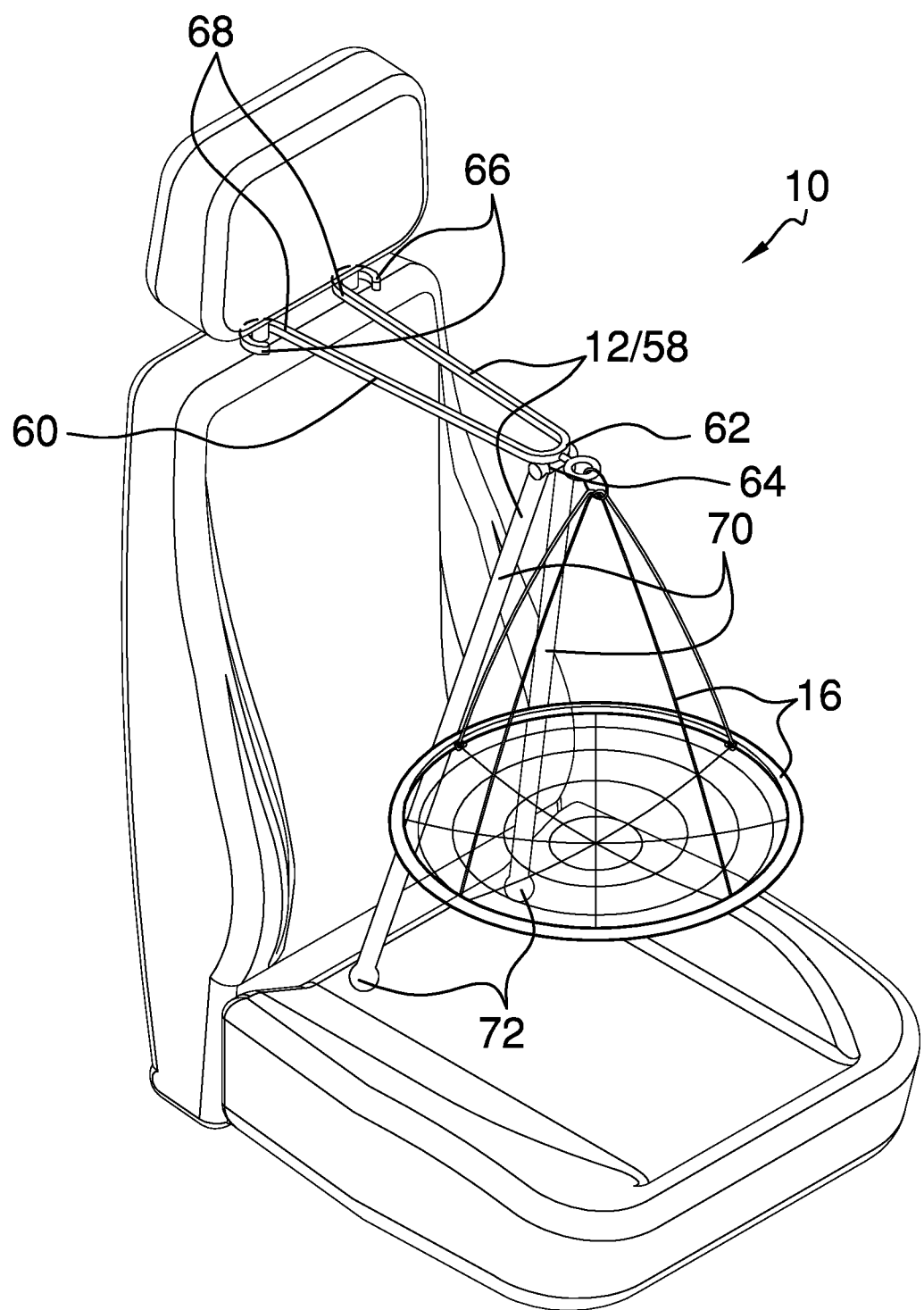
FIG. 9 is an isometric perspective view of an alternative embodiment of the disclosure.
Figure 10:
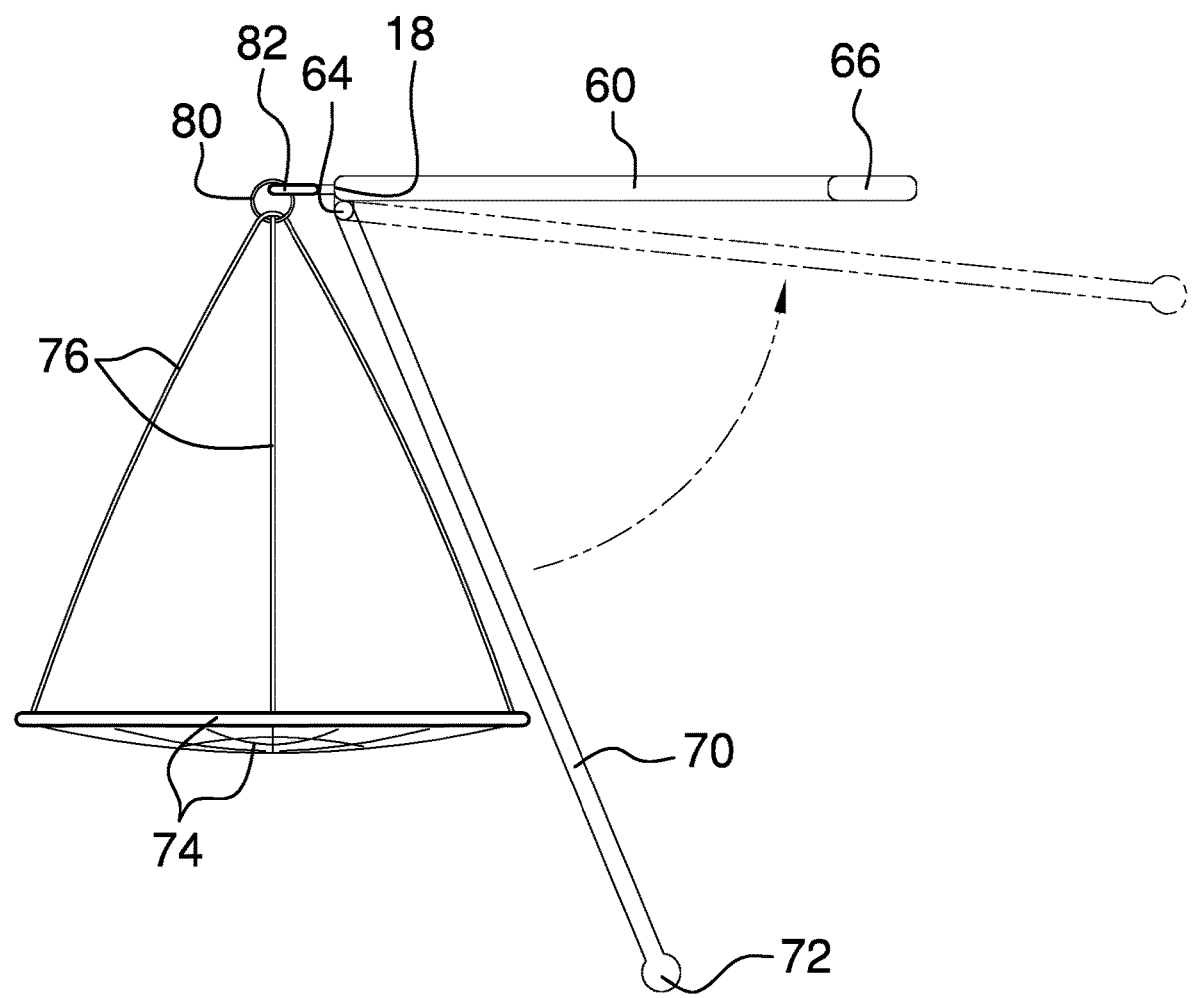
FIG. 10 is a side view of an alternative embodiment of the disclosure.

In still yet another embodiment, as shown in FIGS. 9 and 10, the bracket assembly 12 comprises a seat bracket 58. The seat bracket 58 comprises a first rod 60 that is coupled by a midpoint 62 to a hinge 64. The first rod 60 is substantially V-shaped and is resiliently bendable. A pair of hooks 66 is coupled singly to opposing termini 68 of the first rod 60. The first rod 60 is configured to be grasped in a hand of a user, positioning the user to tighten a grasp on the first rod 60 to motivate the hooks 66 proximally. The pair of hooks 66 thus is configured to be inserted between a pair of posts of a headrest of the vehicle, positioning the user to release the grasp upon the first rod 60 so that each hook 66 couples to a respective post.

Each of a pair of second rods 70 is coupled to and extends transversely from the hinge 64 so that the pair of second rods 70 is V-shaped. The pair of second rods 70 is hingable relative to the first rod 60. The pair of second rods 70 is configured to extend between the hinge 64 and a seat to support the first rod 60 substantially perpendicularly to a backrest to which the headrest is coupled. Each of a pair of spheres 72 is coupled to a respective second rod 70 distal from the hinge 64. The sphere 72 is configured to distribute a load that is applied through the respective second rod 70 to the seat.

The sling 16 comprises a basket 74 and a set of cords 76. The cords 76 are coupled to and extend between the distal limit 18 of the arm 14 and the basket 74 so that the basket 74 is suspended within the interior space. The set of cords 76 may comprise two cords 76, or other number of cords 76, such as three cords 76 and four cords 76. Each cord 76 has opposing ends 78 that are coupled to the basket 74. Each cord 76 passes through a first ring 80, which is loopedly coupled to a second ring 82. The second ring 82 is coupled to the distal limit 18 of the arm 14 so that the sling 16 and the package are swingable relative to the arm 14. The present invention also anticipates the cords 76 being resiliently stretchable.

Figure 6:
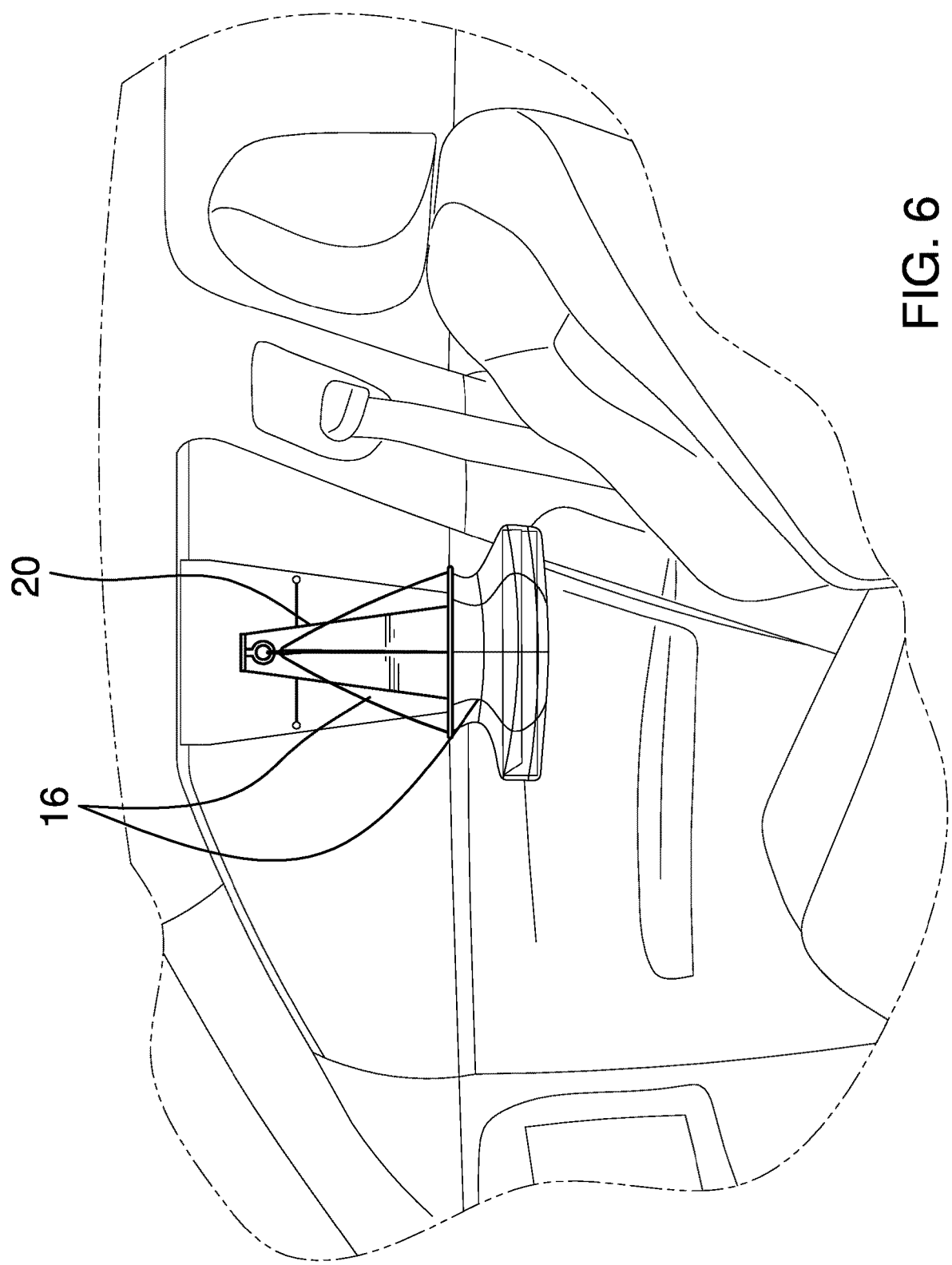
FIG. 6 is an in-use view of an embodiment of the disclosure.

The basket 74 comprises a frame 84 and a mesh 86, which is resiliently stretchable. The mesh 86 is configured to deform as the package is positioned atop the mesh 86. Thus, the mesh 86 is configured to at least partially enclose the package, as shown in FIG. 6. The frame 84 may be substantially circularly shaped, as shown in Figure, or alternatively shaped, such as rectangularly shaped, squarely shaped, ovally shaped, and the like.

The mesh 86 comprises a set of transecting elements 88 and a set of circular elements 90. Each transecting element 88 is coupled to and extends diametrically across the frame 84. Each circular element 90 is coupled to each of the transecting elements 88. Each circular element 90 has a respective diameter so that the set of circular elements 90 comprises circular elements 90 that have a variety of diameters. The set of circular elements 90 is concentrically positioned within the frame 84, as shown in FIG. 3. The set of transecting elements 88 may comprise three transecting elements 88 and the set of circular elements 90 may comprise four circular elements 90, as shown in FIG. 3. The present invention anticipates the set of transecting elements 88 comprising other numbers of transecting elements 88, such as two transecting elements 88 and four transecting elements 88. The present invention also anticipates the set of circular elements 90 comprising other numbers of circular elements 90, such as three circular elements 90 and five circular elements 90.

In use, the user attaches the bracket assembly 12 to the vehicle when planning to transport a package, such as the carry out meal, when the contents of the package can be negatively impacted by forces imparted by movement of the vehicle. The package is positioned in the basket 74, allowing it to swing as the vehicle accelerates, brakes, and turns. The mesh 86, being resiliently stretchable, dampens forces imparted on the package due to the vehicle passing over an uneven surface. These forces are further dampened when using the window bracket 20, due to the set of first bands 40 being resiliently stretchable and the second panel 24 being pivotable relative to the first panel 22, and when using the handle bracket 44 due to the second rod 70 being resiliently bendable and the second band 54 being resiliently stretchable.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A package stabilizing device comprising:
a bracket assembly configured for coupling to an element of a vehicle such that an arm of the bracket assembly extends into an interior space of the vehicle;
a sling coupled to and extending from a distal limit of the arm wherein the sling is configured for positioning a package such that the package is suspended within the interior space wherein the sling is configured for swinging within the interior space for diminishing forces applied to contents of the package as the vehicle traverses an uneven surface, accelerates, brakes, and turns;
the bracket assembly comprising:
a window bracket comprising:
a first panel,
a lip coupled to an upper end of the first panel, the lip being L-shaped such that the lip and the first panel define a channel wherein the channel is configured for inserting an upper edge of a side window of the vehicle for coupling the window bracket to the side window with the first panel in substantial abutment with an inner surface of the side window,
a second panel hingedly coupled to a lower end of the first panel,
a set of first bands coupled to and extending between the first panel and the second panel such that the set of first bands is positioned for supporting the second panel transversely to the first panel in a default position, the first bands being resiliently stretchable wherein the set of first bands is configured for tensioning as the second panel hinges relative to the first panel as the vehicle traverses an uneven surface positioning the set of first bands for rebounding for returning the second panel to the default position, and
an extension coupled to and extending substantially perpendicularly from the second panel distal from the first panel defining the distal limit of the arm.

2. The device of claim 1, further including the first panel being substantially trapezoidally shaped such that the upper end of the first panel is dimensionally wider than the lower end of the first panel.

3. The device of claim 1, further including a pad coupled to the lip and the first panel and positioned in the channel wherein the pad is configured for shielding the side window from being damaged by the lip and the first panel.

4. The device of claim 1, further including a set of cups coupled to a rear face of the first panel, the cups being resiliently compressible wherein the cups are configured for compressing against the inner surface of the side window for suctionally coupling the first plate to the side window.

5. The device of claim 4, further including the set of cups comprising two cups, the cups comprising at least one of rubber, silicone, and elastomer.

6. The device of claim 1, further including the second panel being substantially trapezoidally shaped such that the distal limit of the arm is dimensionally narrower than the lower end of the first panel.

7. The device of claim 1, further including the set of first bands comprising two first bands.

8. The device of claim 1, further including each first band comprising a coiled spring.

9. A package stabilizing device comprising:
a bracket assembly configured for coupling to an element of a vehicle such that an arm of the bracket assembly extends into an interior space of the vehicle;
a sling coupled to and extending from a distal limit of the arm wherein the sling is configured for positioning a package such that the package is suspended within the interior space wherein the sling is configured for swinging within the interior space for diminishing forces applied to contents of the package as the vehicle traverses an uneven surface, accelerates, brakes, and turns; and
the sling comprising a basket and a set of cords, the cords being coupled to and extending between the distal limit of the arm and the basket such that the basket is suspended within the interior space.

10. The device of claim 9, further including the set of cords comprising two cords, each cord having opposing ends coupled to the basket, each cord passing through a first ring, the first ring being loopedly coupled to a second ring coupled to the distal limit of the arm such that the sling and the package are swingable relative to the arm.

11. The device of claim 9, further including the basket comprising a frame and a mesh, the mesh being resiliently stretchable wherein the mesh is configured for deforming as the package is positioned atop the mesh such that the mesh is configured for at least partially enclosing the package.

12. The device of claim 11, comprising:
the frame being substantially circularly shaped; and
the mesh comprising a set of transecting elements and a set of circular elements, each transecting element being coupled to and extending diametrically across the frame, each circular element being coupled to each of the transecting elements, each circular element having a respective diameter such that the set of circular elements comprises circular elements having a variety of diameters such that the set of circular elements is concentrically positioned within the frame.

13. The device of claim 12, further comprising:
the set of transecting elements comprising three transecting elements; and
the set of circular elements comprising four circular elements.

14. A package stabilizing device comprising:
a bracket assembly configured for coupling to an element of a vehicle such that an arm of the bracket assembly extends into an interior space of the vehicle, the bracket assembly comprising at least one of:
  a window bracket comprising:
    a first panel, the first panel being substantially trapezoidally shaped such that an upper end of the first panel is dimensionally wider than a lower end of the first panel,
    a lip coupled to the upper end of the first panel, the lip being L-shaped such that the lip and the first panel define a channel wherein the channel is configured for inserting an upper edge of a side window of the vehicle for coupling the window bracket to the side window with the first panel in substantial abutment with an inner surface of the side window,
    a pad coupled to the lip and the first panel and positioned in the channel wherein the pad is configured for shielding the side window from being damaged by the lip and the first panel,
    a set of cups coupled to a rear face of the first panel, the cups being resiliently compressible wherein the cups are configured for compressing against the inner surface of the side window for suctionally coupling the first plate to the side window, the set of cups comprising two cups, the cups comprising at least one of rubber, silicone, and elastomer,
    a second panel hingedly coupled to the lower end of the first panel, the second panel being substantially trapezoidally shaped such that the distal limit of the arm is dimensionally narrower than the lower end of the first panel,
    a set of first bands coupled to and extending between the first panel and the second panel such that the set of first bands is positioned for supporting the second panel transversely to the first panel in a default position, the first bands being resiliently stretchable wherein the set of first bands is configured for tensioning as the second panel hinges relative to the first panel as the vehicle traverses an uneven surface positioning the set of first bands for rebounding for returning the second panel to the default position, the set of first bands comprising two first bands, each first band comprising a coiled spring, and
    an extension coupled to and extending substantially perpendicularly from the second panel distal from the first panel defining a distal limit of the arm,
  a handle bracket comprising:
    a grapnel configured for coupling to a handle of the vehicle positioned above the side window, the grapnel being single hook type,
    a first bar coupled to and extending from the grapnel such that the first bar is positioned in substantial abutment with the inner surface of the side window when the grapnel is coupled to the handle,
    a second bar coupled to and extending transversely from the first bar distal from the grapnel, the second bar being at least one of S-shaped and resiliently bendable,
    a second band coupled to and extending between the first bar and the second bar such that the second band is positioned for supporting the second bar transversely to the first bar in a default position, the second band being resiliently stretchable wherein the second band is configured for tensioning concurrently the second bar bending as the vehicle traverses the uneven surface positioning the second band for rebounding for returning the second bar to the default position, the second band comprising a bracket spring, and
    a set of bumpers coupled to the first bar such that the bumpers are configured for shielding the side window from being damaged by the first bar, the set of bumpers comprising four bumpers, and
  a seat bracket comprising:
    a hinge,
    a first rod coupled by a midpoint to the hinge, the first rod being substantially V-shaped, the first rod being resiliently bendable,
    a pair of hooks coupled singly to opposing termini of the first rod wherein the first rod is configured for grasping in a hand of a user positioning the user for tightening a grasp on the first rod for motivating the hooks proximally such that the pair of hooks is configured for inserting between a pair of posts of a headrest of the vehicle positioning the user for releasing the grasp upon the first rod such that each hook couples to a respective post,
    a pair of second rods, each second rod being coupled to and extending transversely from the hinge such that the pair of second rods is V-shaped and hingable relative to the first rod wherein the pair of second rods is configured for extending between the hinge and a seat for supporting the first rod substantially perpendicularly to a backrest to which the headrest is coupled, and
    a pair of spheres, each sphere being coupled to a respective second rod distal from the hinge wherein the sphere is configured for distributing a load applied through the respective second rod to the seat; and
  a sling coupled to and extending from the distal limit of the arm wherein the sling is configured for positioning a package such that the package is suspended within the interior space wherein the sling is configured for swinging within the interior space for diminishing forces applied to contents of the package as the vehicle traverses an uneven surface, accelerates, brakes, and turns, the sling comprising a basket and a set of cords, the cords being coupled to and extending between the distal limit of the arm and the basket such that the basket is suspended within the interior space, the set of cords comprising two cords, each cord having opposing ends coupled to the basket, each cord passing through a first ring, the first ring being loopedly coupled to a second ring coupled to the distal limit of the arm such that the sling and the package are swingable relative to the arm, the basket comprising a frame and a mesh, the mesh being resiliently stretchable wherein the mesh is configured for deforming as the package is positioned atop the mesh such that the mesh is configured for at least partially enclosing the package, the frame being substantially circularly shaped, the mesh comprising a set of transecting elements and a set of circular elements, each transecting element being coupled to and extending diametrically across the frame, each circular element being coupled to each of the transecting elements, each circular element having a respective diameter such that the set of circular elements comprises circular elements having a variety of diameters such that the set of circular elements is concentrically positioned within the frame, the set of transecting elements comprising three transecting elements, the set of circular elements comprising four circular elements.

* * * * *